United States Patent [19]

Schaefer

[11] 4,242,875
[45] Jan. 6, 1981

[54] HYDROGEN CRYOGENIC PURIFICATION SYSTEM

[75] Inventor: Arthur E. Schaefer, Arcadia, Calif.

[73] Assignee: C F Braun & Co., Alhambra, Calif.

[21] Appl. No.: 904,373

[22] Filed: May 10, 1978

[51] Int. Cl.² .............................................. F25J 3/08
[52] U.S. Cl. ......................................... 62/23; 62/11
[58] Field of Search ............................... 62/11, 23-28

[56] References Cited

U.S. PATENT DOCUMENTS

| | | | |
|---|---|---|---|
| 2,849,867 | 9/1958 | Haringhuizen | 62/23 |
| 3,359,744 | 12/1967 | Bolez et al. | 62/23 |
| 3,626,705 | 12/1971 | Knapp et al. | 62/23 |
| 3,691,779 | 9/1972 | Meisler et al. | 62/23 |

*Primary Examiner*—Norman Yudkoff
*Attorney, Agent, or Firm*—Lyon & Lyon

[57] ABSTRACT

A process is disclosed for the cryogenic purification of industrial by-product gas streams containing recoverable hydrogen. Two feed streams, one of which contains non-readily condensible compounds having boiling points below that of methane, are passed through a successive series of cooling and separation stages. A condensed bottom fraction is separated in a separation drum from an overhead of increasing purity at each stage, and the condensates are combined into one or more condensate streams. The overhead from the stream containing the non-readily condensible compounds is injected into a combined condensate stream, reducing the temperature thereof, and the combined condensate stream is passed back through the heat exchange means to provide refrigeration for the system. An increased amount of hydrogen product is thereby recovered. Additionally, the condensate streams may be passed separately back through the heat exchange means to recover their more valuable components which are suitable for further purification. In particular, unsaturated hydrocarbons can be recovered in a more concentrated form for improved ethylene and propylene recovery.

21 Claims, 2 Drawing Figures

HYDROGEN CRYOGENIC PURIFICATION SYSTEM

BACKGROUND OF THE INVENTION

1. Field Of The Invention

The present invention is directed to the cryogenic purification of industrial by-product hydrogen streams to recover a high purity hydrogen product. More specifically, the present invention relates to the use of a second hydrogen feed stream containing, as impurities, non-readily condensible compounds having boiling points below that of methane to alter the physical properties of the flashed condensate, thus enhancing refrigeration for the process and providing maximum recovery of purified hydrogen.

2. Description Of The Prior Art

Refineries and petrochemical plants employ many processes which produce by-product hydrogen. Thus, many methods are known in the prior art for purifying such by-product hydrogen by cryogenic means to produce high purity hydrogen that can be used for hydrocracking and hydrotreating petroleum materials. Prior art methods for hydrogen purification by cryogenic means have historically compressed and combined the various hydrogen containing feed streams and cooled such combined streams by heat exchange utilizing a series of separations so that the liquid condensate is cooled no further than necessary. The hydrogen is cooled to a low enough temperature so that sufficient impurities are condensed out and the hydrogen meets the required purity specification.

The refrigeration in these various cryogenic processes can be a separate, external refrigeration system as disclosed in Knapp, U.S. Pat. No. 3,626,705, and Meisler, U.S. Pat. No. 3,628,340, or it may be provided by the reduction in pressure of the liquid condensate to cause it to flash to a lower temperature, as exemplified by Bolez, U.S. Pat. No. 3,359,744, who also combines part of the product hydrogen with the liquid condensate to provide additional refrigeration of the system, or it may be an expander, as shown in Banikiotes, U.S. Pat. No. 3,796,059.

Oftentimes, petroleum processes produce a by-product hydrogen stream that also contains nitrogen, or some other non-readily condensible compound which has a boiling point below that of methane. An example is the by-product hydrogen stream from a fluid bed catalytic cracker. These types of impurities are extremely undesirable in hydrocracking or hydrotreating processes. Thus, the cryogenic purification processes known in the prior art have done one of two things. First, they combine all of the by-product hydrogen streams from various industrial processes into one feed stream containing hydrogen, various hydrocarbons, and the non-readily condensible compounds with boiling points below that of methane. See, for example, the process described in Meisler, U.S. Pat. No. 3,691,779. However, if the feeds are combined, either colder temperatures or an adsorption system is required to remove the non-readily condensible impurities, thus requiring additional energy consumption, or the utilization of the hydrogen product is decreased. In Meisler's combined feed system, an adsorption system is employed to remove the nitrogen remaining after a series of cooling and condensation stages with successively lower temperatures. The additional energy consumption which is required to remove these non-readily condensible compounds so that the product hydrogen can be used as a chemical reactant is very costly and clearly undesirable in today's energy conscious society.

The second alternative known in the prior art is simply not to purify such by-product hydrogen streams, but to use them merely as fuel gas. An example of a cryogenic purification process utilizing only by-product hydrogen streams containing hydrocarbons is the aforesaid Bolez patent. Bolez discloses an autogenous cryogenic process which injects part of the purified hydrogen overhead into the flashed liquid condensate in order to provide additional refrigeration such that the lower temperatures will produce hydrogen of the desired purity. The injected hydrogen reduces the partial pressure of the liquid hydrocarbons, consequently reducing their temperature. While the lowered temperature results in a purer hydrogen product, this occurs only at a significant loss of product hydrogen.

Most of the cryogenic processes known in the prior art have considered only the utilization of a single feed stream. This is clearly disclosed by Meisler, U.S. Pat. No. 3,691,779 in which a multiplicity of feed streams are discussed, viz., the original feed stream and the purified stream used to regenerate the adsorption beds, but in each case they are combined into a single feed stream. While the Banikiotes patent discloses an integrated cryogenic process to purify two separate hydrogen streams to recover a single hydrogen product, the second feed stream is used only as a make-up feed stream in order to insure a constant yield of hydrogen product. It is not used to provide increased refrigeration for the system by altering the physical properties of the flashed liquid condensate, thus resulting in increased output of product hydrogen.

An examination of the prior art therefore discloses the need for a cryogenic process which can utilize all types of by-product hydrogen streams without requiring additional costly purification steps or the sacrifice of a percentage of total hydrogen recovery.

SUMMARY OF THE INVENTION

The present invention provides a process for cryogenic purification of industrial by-product gas streams which contain hydrogen in recoverable amounts in which a second, separate feed stream is employed to enhance the refrigeration of the purification system and permit the recovery of an increased amount of hydrogen of the desired purity. Providing a second, separate feed stream allows by-product hydrogen streams to be used which contain non-readily condensible impurities with boiling points below that of methane, such as nitrogen or helium, which are detrimental to a hydrogen product utilized in hydrocracking or hydrotreating processes. An example of such a by-product hydrogen stream is that from a fluid bed catalytic cracker. Since the feed streams are not combined into a single feed stream, colder temperatures or an additional purification system, such as an adsorption system, are not required to remove the non-readily condensible impurities before the hydrogen product can be used as a chemical reactant. The present invention therefore requires less energy consumption to attain the desired purity of the hydrogen product but the utilization of the hydrogen product is not decreased, since the hydrogen product of the present invention does not contain such non-readily condensible impurities. And, since the second feed stream is employed to alter the physical properties of the condensate, thereby enhancing the refrigeration in the system, rather than employing a portion of the product hydrogen stream, an increased percentage of product hydrogen is recovered. Finally, the second hydrogen containing feed stream does not need to be compressed to as high a pressure as the main feed since its purpose is to provide the hydrogen which is combined with the liquid condensate to enhance the refrigeration of the system. This also results in a decrease in energy consumption as horsepower is saved.

The purification process of the present invention comprises passing two separate by-product gas streams containing hydrogen in recoverable amounts, one of which contains non-readily condensible impurities having a boiling point below that of methane, through a successive series of cooling and separation stages. At each separation stage, a liquid bottom fraction containing hydrocarbons is separated from the overhead of the respective by-product feed gas steam until the overhead of the hydrogen product feed stream attains the desired purity. The hydrogen product overhead is passed back through the heat exchange means to provide refrigeration for the process, and the overhead is recovered as product. The overhead of the feed stream containing the non-readily condensible impurities is injected into the liquid condensate stream containing the combined liquid bottom fractions. This reduces the partial pressure of the condensates, thereby reducing the temperature thereof. The condensate stream is also then passed back through the first and second heat exchange means to provide increased refrigeration for the process, and the condensates are recovered as a fuel gas by-product.

Additionally, when one or both of the feed streams contains hydrocarbons as impurities in recoverable amounts, the hydrocarbons can be recovered in more concentrated forms then they occur in the feed streams by employing separate condensate streams. In particular, when the by-product hydrogen stream containing the non-readily condensible impurities also contains unsaturated hydrocarbons in recoverable amounts, the unsaturated hydrocarbons can be recovered in a more concentrated form for improved ethylene and propylene recovery.

Use of the second hydrogen gas overhead which contains the non-readily condensible impurities to inject into the combined condensate stream therefore achieves three objectives: (1) all by-product hydrogen streams can be utilized without incurring additional costly purification steps or decreasing the utility of the product hydrogen; (2) introducing hydrogen into the combined condensate stream enhances the refrigeration in the stream, thereby increasing the purity of the product hydrogen; (3) part of the product hydrogen stream is not injected into the combined condensate stream, thereby increasing the production of product hydrogen.

Accordingly, it is an object of this invention to provide a cryogenic purification process for by-product hydrogen streams employing a second by-product hydrogen feed stream that contains non-readily condensible impurities having boiling points below that of methane to maximize recovery of the uncontaminated hydrogen.

It is another object of this invention to provide a cryogenic purification process for by-product streams employing a second by-product hydrogen feed stream which can contain non-readily condensible compounds having boiling points below that of methane without requiring additional separation stages to remove such impurities.

It is still another object of this invention to provide a cryogenic purification process for by-product hydrogen streams employing a second by-product hydrogen feed stream which does not require compression to as high a pressure as the first feed stream since its purpose is to provide the hydrogen to be combined with the liquid condensate to enhance the refrigeration of the process, thus saving energy.

It is a further object of this invention to provide a cryogenic purification process for by-product hydrogen streams employing a second by-product hydrogen feed stream to recover various hydrocarbons in a more concentrated form.

The manner in which these and other objects and advantages of the invention are achieved will become apparent from the detailed description of the preferred embodiment and from the accompanying drawings which follow.

DETAILED DESCRIPTION OF THE INVENTION

Figure 1:
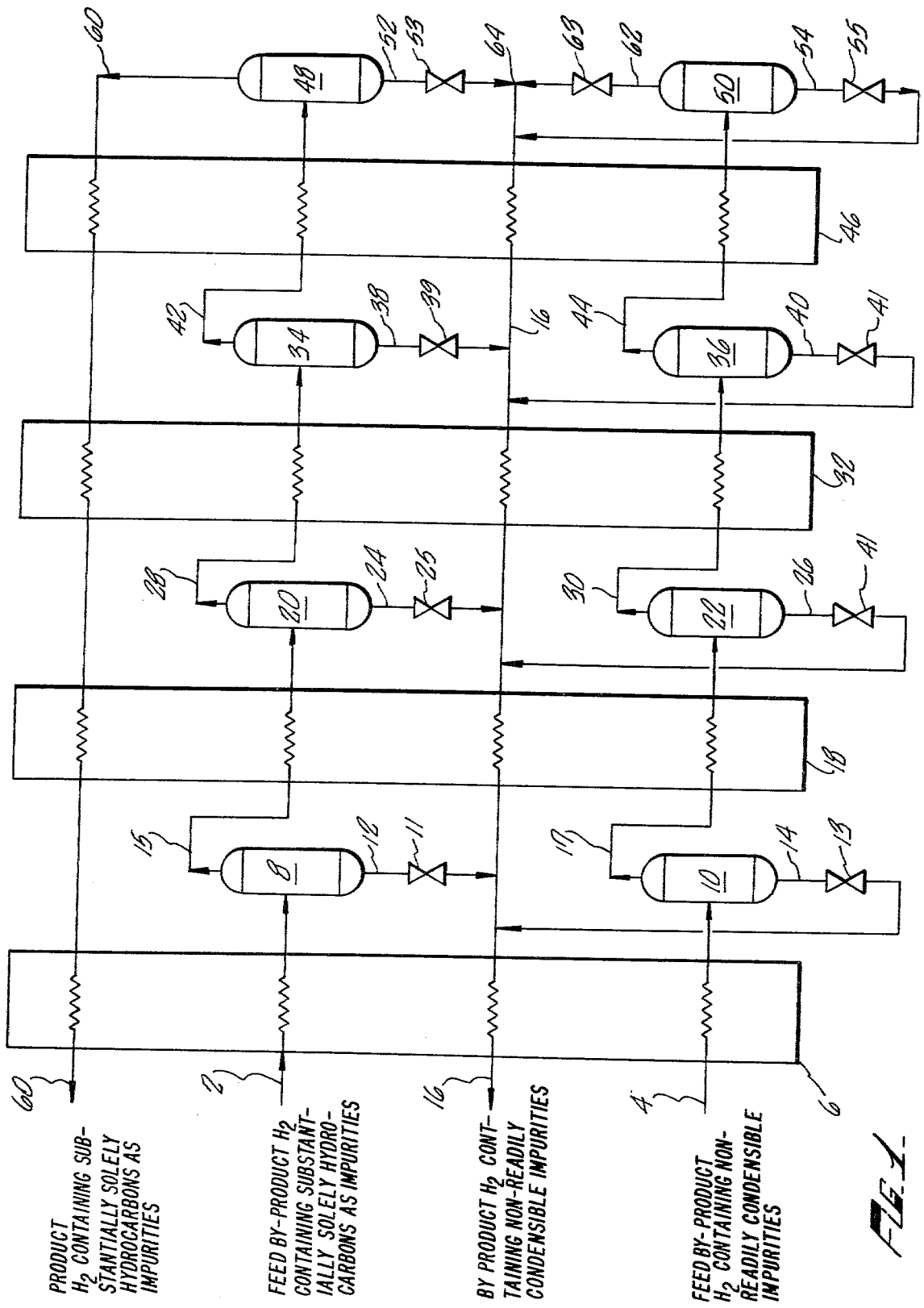
FIG. 1 is a schematic representation of the principal elements in the cryogenic separation process employing two separate feed streams which maximizes the amount of product hydrogen produced.

The composition of by-product hydrogen streams from various industrial processes are critically examined and the streams are segregated into two groups in order to optimize the conditions required in order to recover hydrogen of the desired purity. Referring to FIG. 1, a first by-product hydrogen stream containing substantially solely hydrocarbons as impurities enters the cryogenic purification system at inlet 2. A second by-product hydrogen feed stream similar in composition to the first by-product hydrogen stream but also containing non-readily condensible compounds having boiling points below that of methane as impurities enters the purification system at inlet 4. The two separate feed streams have previously been dried to remove water and have an inlet temperature between about 50° to about 140° F., more particularly about 60° to about 120° F. The first feed stream has an inlet pressure between about 250° to about 900 psia, more particularly about 350 psia to about 600 psia, and the second feed stream has an inlet pressure between about 50 to about 900 psia, more particularly about 150 to about 600 psia.

The choice of inlet temperature and pressure is dependent upon the composition of the feed streams and the desired purity of the hydrogen product, and is within the knowledge of one having ordinary skill in the art. Looking at Example 1 which is used to illustrate the following description of the invention, a typical first feed stream having that composition may have an inlet temperature of about 100° F. and an inlet pressure of about 510 psia while a typical second feed stream may have an inlet temperature of about 100° F. and an inlet pressure of about 200 psia. The second feed stream does not need to be compressed to as high a pressure as the first feed stream since its purpose is to provide hydrogen to be combined with the liquid condensate to enhance refrigeration of the system.

Following the feed streams of Example 1 through the process of the present invention, the two separate feed streams pass through a first heat exchange means 6 where the feed streams are cooled by the flow of product streams back through the process. The first feed stream then passes into a first separation drum 8 at a temperature of about −30° F. and the second feed stream passes into a second separation drum 10 at a temperature of about −30° F. The pressure of each feed stream drops slightly, e.g. about 2 or 3 psig, each time it enters a separation drum. The cooling of the feed stream causes impurities therein to liquify, and the liquid condensates are separated from the vapor by gravity in the separation drums.

A first condensed bottom fraction containing hydrocarbons is removed from the first separation drum through line 12 and a second condensed bottom fraction containing hydrocarbons is removed from the second separation drum through line 14. The separate condensate streams pass through pressure let down valves, 11 and 13, respectively, causing the condensates in each feed stream to flash to a lower pressure thereby producing refrigeration, before passing into the combined condensate stream in line 16.

A partially purified first gas stream overhead is also removed from the first drum in line 15 and a second partially purified overhead is likewise removed from the second separation drum in line 17. The two separate overheads then pass through a second heat exchange means 18 and are further cooled by the flow of product streams back through the process. The first partially purified overhead passes into a third separation drum 20 at a temperature of about −180° F. and the second partially purified overhead passes into a fourth separation drum 22 at about the same temperature, where the liquid bottom fractions which were condensed by the cooling are separated from the vapor by gravity. The separate condensed bottom fractions containing mostly hydrocarbons are removed through lines 24 and 26 whereupon they pass through pressure let down valves 25 and 27 which flash the condensate to a lower pressure, thereby producing refrigeration. The condensed bottom fractions then pass into line 16 which contains the combined condensate stream.

A further purified first gas stream overhead is then removed from the third drum through line 28 and a second partially purified overhead is likewise removed from the fourth separation drum in line 30, and the overheads pass through a third heat exchange means 32 which further cools the overheads to about −225° F. The first gas stream overhead passes into a fifth separation drum 34 and the second gas stream overhead passes into a sixth separation drum 36 where the condensed bottom fractions are removed through lines 38 and 40 and pass through pressure let down valves 39 and 41 before joining the combined condensate stream in line 16.

A fourth cooling and separation stage follows with the first overhead from the fifth drum removed through line 42 and the second overhead from the sixth drum removed through line 44 and cooled to about −274° F. as they pass through a fourth heat exchange means 46. The final separation drum may have a temperature range of about −240° to about −280° F. dependent upon the initial pressure used and the desired purity of the hydrogen product.

The first overhead passes into a seventh separation drum 48 and the second overhead passes into an eighth separation drum 50 where the liquid bottom fractions condensed by the cooling are separated from the vapor. These separate condensed bottom fractions are removed through lines 52 and 54 and pass through pressure let down valves 53 and 55 which flash the condensate to a lower pressure to produce refrigeration, and the separate condensate streams pass into the combined condensate stream in line 16.

A first hydrogen overhead is removed from the seventh separation drum in line 60 at about −274° F. and about 500 psia and is passed back through the process to provide refrigeration, reaching a temperature of about −230° F. after passing through the fourth heat exchange means, about −195° F. after the third heat exchange means, about −40° F. after the second heat exchange means, and is recovered as the purified hydrogen product at about 90° F. and about 490 psia after passing through the first heat exchange means.

A second hydrogen gas overhead which contains the non-readily condensible impurities is removed from the eighth separation drum in line 62 at about −274° F. and passes through a pressure let down valve 63 before being injected into the combined condensate stream 16 at 64. The addition of hydrogen to the combined condensate stream reduces the partial pressure of the condensates, thereby reducing their temperature and enhancing the refrigeration in the purification system. The combined condensate stream has a temperature of about −285° F. and a pressure of about 40 psia before it passes back through the process to provide refrigeration, attaining a temperature of about −230° F. after passing through the fourth heat exchange means, about −185° F. after the third heat exchange means, about −40° F. after the second heat exchange means, and is recovered as a fuel gas by-product about 90° F. and about 30 psia after passing through the first heat exchange means.

Figure 2:
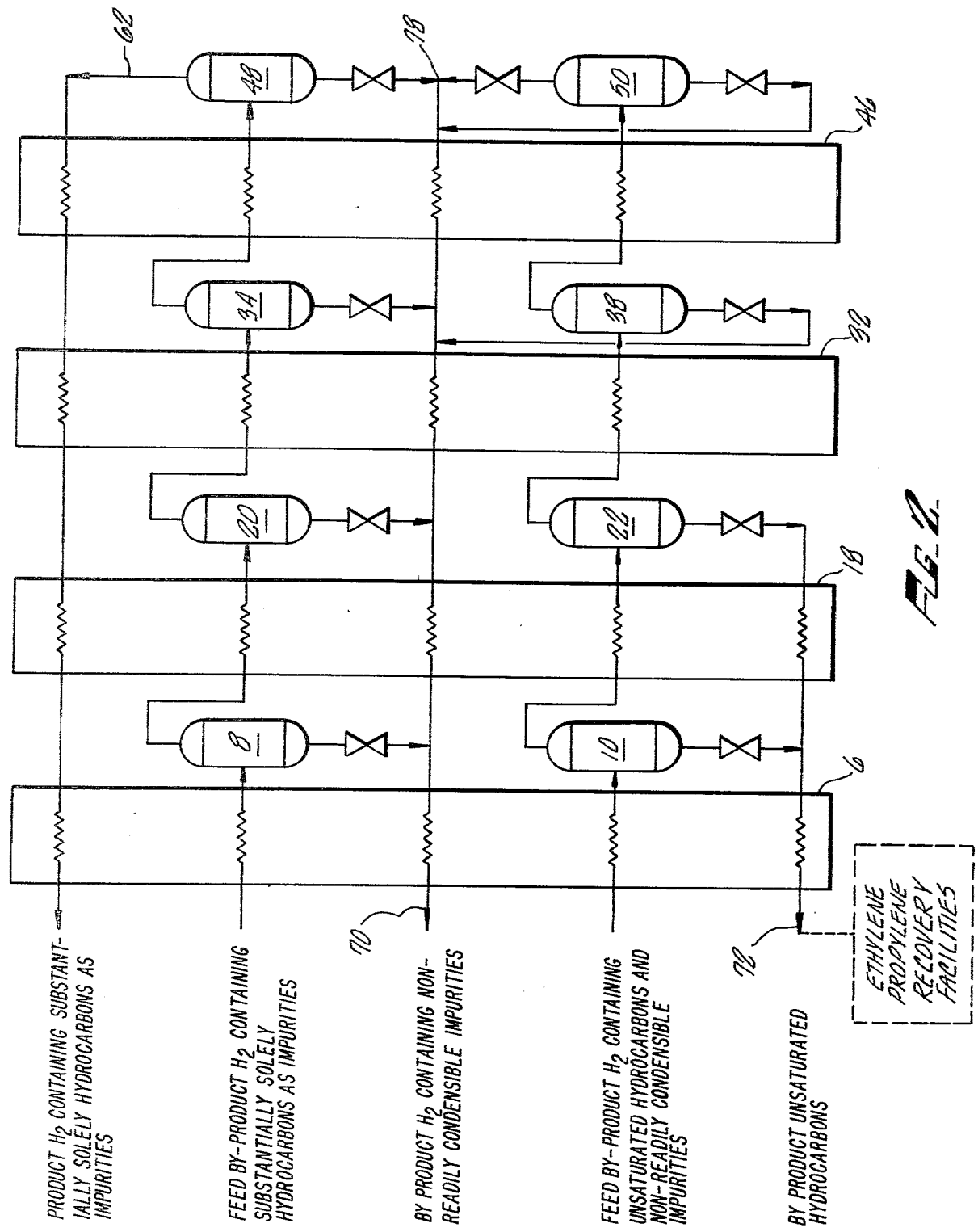
FIG. 2 is a schematic representation of the principal elements in the cryogenic separation process employing two separate feed streams which recovers unsaturated hydrocarbons in a more concentrated form.

Additionally, when one of the feed streams contains hydrocarbons as impurities in recoverable amounts, the hydrocarbons can be recovered in more concentrated forms by employing separate condensate streams. In particular, when the second by-product hydrogen stream containing the non-readily condensible impurities also contains unsaturated hydrocarbons in recoverable amounts as impurities, the unsaturated hydrocarbons can be recovered in a more concentrated form as shown in FIG. 2. The first and second by-product hydrogen streams pass through a series of cooling and separation stages as described with FIG. 1. However, the condensed bottom fractions from separation drums 8, 20, 34, 36, 48, and 50 which contain mostly various hydrocarbons, are combined into a combined hydrocarbons stream in line 70. The condensed bottom fractions from separation drums 10 and 22, which contain mostly unsaturated hydrocarbons are combined into a combined unsaturated hydrocarbons stream in line 72. The combined unsaturated hydrocarbons stream then passes back in line 72 through the process to provide refrigeration before recovering the unsaturated hydrocarbons as product for use in ethylene-propylene recovery facilities. The first hydrogen gas overhead which is removed from the separation drum 48 through line 62 passes back through the process to provide refrigeration as described above and is recovered as product hydrogen. The second hydrogen gas overhead containing the non-readily condensible impurities is injected at 78 into line 70 which contains the combined hydrocarbons stream, thereby reducing its temperature. The combined hydrocarbons stream then also passes back through the process to provide enhanced refrigeration before recovering the hydrocarbons as a fuel gas by-product.

The two by-product hydrogen feed streams have the following typical characteristics:

EXAMPLE I

| I Composition (Mole %) of inlet feed streams | | |
|---|---|---|
| | First by-product $H_2$ stream | Second by-product $H_2$ stream |
| nitrogen | trace | 5.7 |
| carbon monoxide | 0.2 | 0.6 |
| hydrogen | 66.4 | 31.4 |
| methane | 28.1 | 32.2 |
| ethylene | 1.0 | 12.3 |
| ethane | 1.6 | 15.0 |
| $C_3$'s | 1.2 | 2.1 |
| $C_4$'s | 0.9 | 0.5 |
| $C_5$ and above | 0.6 | 0.2 |
| Temperature | 100° F. | 100° F. |
| Pressure | 510 psig | 200 psig |

| II Composition (Mole % of product streams) | | |
|---|---|---|
| | (FIG. 1 and 2) Hydrogen | (FIG. 2) Ethylene-propylene recovery |
| hydrogen | 97.0 | 0.9 |
| methane | 2.8 | 29.4 |
| ethylene | — | 22.9 |
| ethane | — | 29.0 |
| $C_3$'s | — | 5.8 |
| $C_4$'s | — | 4.8 |
| $C_5$'s | — | 5.1 |
| carbon monoxide | 0.2 | 0.2 |
| nitrogen | trace | 1.9 |
| Temperature | 90° F. | 90° F. |
| Pressure | 490 psig | 30 psig |

While the preferred application of this invention has been shown and described, it would be apparent to those skilled in the art that many more modifications are possible without departing from the inventive concept herein described. Thus, simplification of the process by eliminating the intermediate separation drums, or providing extra steps for additional refrigeration such as the addition of expanders to the process to promote heat balance does not alter the present invention. Furthermore, the two feed streams shown in Example 1 are illustrative only. Any feed stream containing hydrogen and/or hydrocarbon in recoverable amounts may be used in the process of the present invention. In particular, not only nitrogen but a number of non-condensible impurities having boiling points below that of methane may be contained in the second feed stream to maximize the amount of hydrogen recovered and to gain the advantages of the present invention. The invention, therefore, is to be limited only by the lawful scope of the claims which follow.

I claim:

1. A process for the cryogenic purification of industrial by-product gas streams containing impure hydrogen in recoverable amounts, one of the by-product hydrogen gas streams also containing non-readily condensible impurities having boiling points below that of methane, which comprises the steps of:
    (a) passing a first and second hydrogen containing gas streams through a successive series of cooling and separation stages, the first gas stream containing hydrocarbons as substantially the sole impurities and the second gas stream containing nitrogen or other non-readily condensible impurities having boiling points below that of methane;
    (b) separating at each such separation stage from the first and second hydrogen containing gas streams a purified gas stream overhead from a condensed bottom fraction, the purified overhead of the second gas stream also containing the non-readily condensible impurities, and combining the bottom fractions into one or more condensate streams;
    (c) injecting the overhead containing the non-readily condensible impurities from the final separation stage into a condenstate stream containing combined bottom fractions; and
    (d) recovering the overhead of the first stream as hydrogen product of desired purity.

2. The process of claim 1 wherein the by-product hydrogen gas streams also contain hydrocarbons in recoverable amounts as impurities, and recovering the hydrocarbons in a concentrated form.

3. The process of claim 2 wherein said hydrocarbons are unsaturated hydrocarbons, and said unsaturated hydrocarbons are recovered for use in ethylene-propylene recovery facilities.

4. The process of claim 1 wherein the first and second hydrogen containing gas streams are cooled by passing them through a heat exchange means which uses the flow of streams from the separation stages back through the process for refrigeration.

5. The process of claim 1 wherein the condensed bottom fractions are flashed to a lower pressure than the pressure at the separation stages to produce refrigeration for the process.

6. A process for the cryogenic purification of industrial by-product gas streams containing impure hydrogen in recoverable amounts which comprises:
    (a) passing a first gas stream containing hydrogen with hydrocarbons as substantially the sole impurities and a second gas stream containing hydrogen, and as impurities, hydrocarbons and non-readily condensible compounds having boiling points below methane through a successive series of cooling and separation stages;
    (b) separating at each such separation stage from the first and the second gas stream a purified gas stream overhead from a condensed bottom fraction containing hydrocarbons, the overhead from the second gas stream also containing the non-readily condensible compounds, and combining the bottom fractions into one or more condensate streams;
    (c) injecting the overhead from the final separation stage of the second gas stream which contains the non-readily condensible compounds into a condensate steam containing combined bottom fractions to reduce the partial pressure of the condensates thereby reducing the temperature thereof;
    (d) passing the overhead from the first gas stream back through the process to provide refrigeration for the process and recovering the overhead as hydrogen product of the desired purity;
    (e) passing the condensate stream containing the injected overhead back through the process to provide enhanced refrigeration for the process and recovering the condensate stream as a fuel gas by-product.

7. The process of claim 6 wherein the by-product hydrogen gas streams also contain hydrocarbons in recoverable amounts as impurities, and recovering the hydrocarbons in a concentrated form.

8. The process of claim 7 wherein the by-product hydrogen gas stream containing the non-readily condensible impurities also contains unsaturated hydrocarbons in recoverable amounts as impurities, and recovering the unsaturated hydrocarbons for use in ethylene-propylene recovery facilities.

9. The process of claim 6 wherein the first and second hydrogen containing gas streams are cooled by passing them through a heat exchange means which uses the flow of streams from the separation stages back through the process for refrigeration.

10. The process of claim 6 wherein the condensed bottom fractions are flashed to a lower pressure than the pressure at the separation stages to provide refrigeration for the process.

11. A process for the cryogenic purification of industrial by-product gas streams containing impure hydrogen in recoverable amounts which comprises the steps of:
(a) cooling a first gas stream containing hydrogen with hydrocarbons as substantially the sole impurities impurities and a second gas stream containing hydrogen with hydrocarbons and non-readily condensible compounds having boiling points below methane as impurities in a first heat exchange means which employs the countercurrent flow of product streams from the process for refrigeration;
(b) passing the cooled first gas stream into a first separation drum, and passing the cooled second gas stream into a second separation drum;
(c) removing from the first separation drum a partially purified first gas stream overhead and removing from the second separation drum a partially purified second gas stream overhead;
(d) further removing from the first and second separation drums first and second condensed bottom fractions and passing each of the bottom fractions into a combined condensate stream;
(e) further cooling the partially purified first gas stream overhead and the partially purified second gas stream overhead in a second heat exchange means which employs the countercurrent flow of product streams from the process for refrigeration;
(f) passing the further cooled partially purified first gas stream overhead into a third separation drum, and passing the further cooled partially purified second gas stream overhead into a fourth separation drum;
(g) removing from the third separation drum a first hydrogen gas overhead and removing from the fourth separator drum a second hydrogen gas overhead containing the non-readily condensible compounds;
(h) further removing from the third and fourth separation drums third and fourth condensed bottom fractions and passing each of the bottom fractions into the combined condensate stream;
(i) passing the first hydrogen gas overhead back through the second and first heat exchange means to provide refrigeration for the process and recovering the hydrogen gas as product;
(j) injecting the second hydrogen gas overhead containing the non-readily condensible compounds into the combined condensate stream to reduce the partial pressure of the condensates thereby reducing the temperature thereof; and
(k) passing the combined condensate stream back through the second and first heat exchange means to provide enhanced refrigeration for the process and recovering the condensate as a fuel gas by-product.

12. The process of claim 11 wherein the first and second hydrogen gas streams pass through a series of three or more cooling and separation stages employing the heat exchange means and the separation drums.

13. A process for the cryogenic purification of industrial by-product gas streams containing impure hydrogen in recoverable amounts which comprises the steps of:
(a) cooling a first gas stream containing hydrogen and hydrocarbons as substantially the sole impurities and a second gas stream containing hydrogen, non-readily condensible impurities having boiling points below methane, and unsaturated hydrocarbons in a first heat exchange means which employs the countercurrent flow of product streams from the process for refrigeration;
(b) passing the cooled first gas stream into a first separation drum, and passing the cooled second gas stream into a second separation drum;
(c) removing from the first separation drum a partially purified first gas stream overhead and removing from the second separation drum a partially purified second gas stream overhead;
(d) further removing from the first and second separation drums first and second condensed bottom fractions, and passing the first condensed bottom fraction containing hydrocarbons into a combined hydrocarbons stream and passing the second condensed bottom fraction containing unsaturated hydrocarbons into a combined unsaturated hydrocarbons stream;
(e) further cooling the partially purified first gas stream overhead and the partially purified second gas stream overhead in a second heat exchange means which employs the countercurrent flow of product streams from the process for refrigeration;
(f) passing the further cooled partially purified first gas stream overhead into a third separation drum and passing the further cooled partially purified second gas stream overhead into a fourth separation drum;
(g) removing from the third separation drum a first hydrogen gas overhead and removing from the fourth separation drum a second hydrogen has overhead containing the non-readily condensible impurities;
(h) further removing from the third and fourth separation drums third and fourth condensed bottom fractions, and passing the third condensed bottom fraction into the combined hydrocarbons stream and passing the fourth condensed bottom fraction into the combined unsaturated hydrocarbons stream;
(i) passing the first hydrogen gas overhead back through the second and first heat exchange means to provide refrigeration for the process and recovering the hydrogen gas as a product.
(j) injecting the second hydrogen gas overhead containing the non-readily condensible impurities into the combined hydrocarbons stream to reduce the partial pressure of the hydrocarbons stream thereby reducing the temperature thereof;

(k) passing the combined saturated hydrocarbon stream back through the second and first heat exchange means to provide enhanced refrigeration for the process and recovering the hydrocarbons stream as a fuel gas by-product;

(l) passing the combined unsaturated hydrocarbon stream back through the second and first heat exchange means to provide refrigeration for the process and recovering the unsaturated hydrocarbons as product for use in ethylene-propylene recovery facilities.

14. The process of claim 13 wherein the first and second hydrogen gas streams pass through a series of three or more cooling and separation stages employing the heat exchange means and the separation drums.

15. In a process for the cryogenic purification of industrial by-product gas streams containing hydrogen in recoverable amounts which comprises the steps of passing a first by-product hydrogen feed stream containing hydrogen with hydrocarbons as substantially the sole impurities through a successive series of cooling and separation stages in which a liquid bottom fraction containing hydrocarbons is removed at each separation stage and the fractions are combined into a combined condensate stream until a first purified hydrogen gas overhead of the desired purity is obtained as product wherein the improvement comprises:

(a) passing a second by-product hydrogen gas stream with hydrocarbons and non-readily condensible compounds having boiling points below methane as impurities through a successive series of cooling and separation stages in conjunction with the first by-product hydrogen stream;

(b) separating at each such separation stage a purified gas stream overhead from a condensed bottom fraction containing hydrocarbons, the overhead from the second gas stream also containing the non-readily condensible compounds, and combining the bottom fractions into one or more condensate streams;

(c) injecting the overhead containing the non-readily condensible compounds from the final separation stage into a condensate stream containing combined bottom fractions to reduce the partial pressure of the condensates thereby reducing the temperatures thereof; and (d) passing the condensate stream containing the injected overhead back through the process to provide refrigeration.

16. The process of claim 13 wherein the by-product hydrogen gas streams also contain hydrocarbons in recoverable amounts as impurities, and recovering the hydrocarbons in a concentrated form.

17. The process of claim 14 wherein the by-product hydrogen gas stream containing the non-readily condensible impurities also contain unsaturated hydrocarbons in recoverable amounts as impurities, and recovering the unsaturated hydrocarbons for use in ethylene-propylene recovery facilities.

18. The process of claim 13 wherein the first and second hydrogen containing gas streams are cooled by passing them through a heat exchange means which uses the flow of streams from the separation stages back through the process for refrigeration.

19. The process of claim 13 wherein the condensed bottom fractions are flashed to a lower pressure than the pressure at the separation stages to produce refrigeration for the process.

20. The process as in claims 1, 6, 11, 13, or 15 wherein the first and second hydrogen gas streams have an inlet temperature between about 50° to about 140° F., the first hydrogen gas stream has an inlet pressure between 250 to about 900 psia, and the second hydrogen gas stream has an inlet pressure between about 50 to about 900 psia.

21. The process as in claims 1, 6, 11, 13 or 15 wherein the first and second hydrogen gas streams have an inlet temperature between about 60° to about 120° F., the first hydrogen gas stream has an inlet pressure between about 350 to about 600 psia, and the second hydrogen gas stream has an inlet pressure between about 150 to about 600 psia.

* * * * *